May 12, 1936.                    W. D. NORE                    2,040,759
                                 SAFETY TIRE
                              Filed Dec. 5, 1934
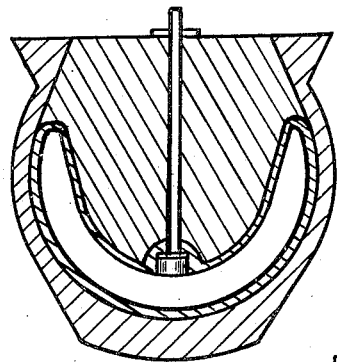
Fig. 2
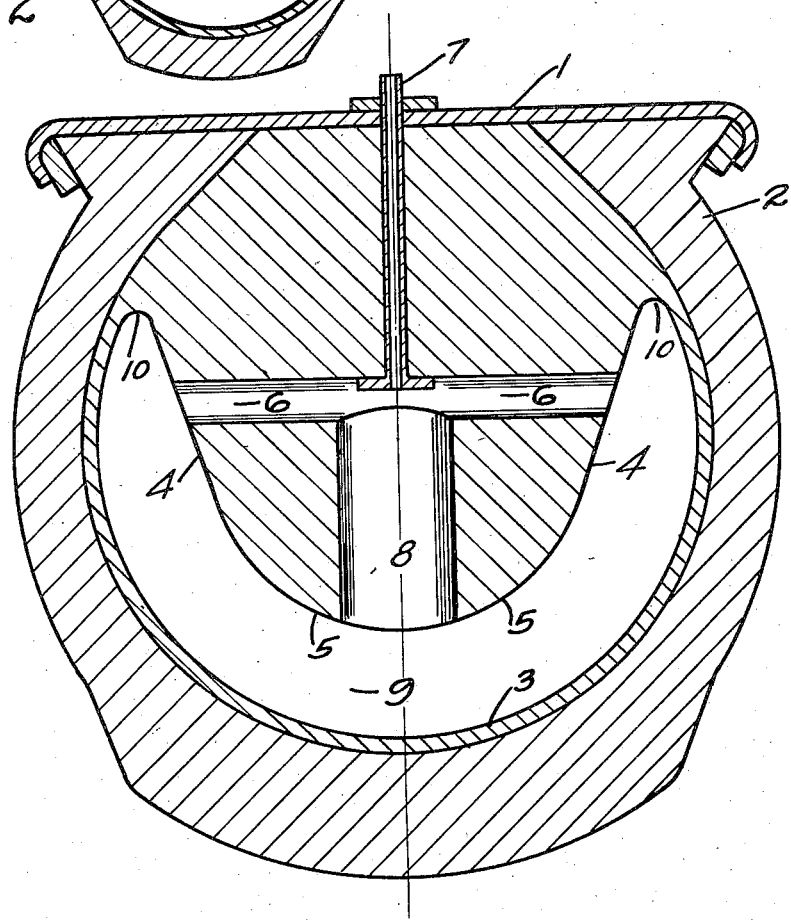
Fig. I
INVENTOR.
W. D. NORE
BY
ATTORNEY Patented May 12, 1936

2,040,759

UNITED STATES PATENT OFFICE 2,040,759

SAFETY TIRE

Waldo D. Nore, Pitcairn, Pa.

Application December 5, 1934, Serial No. 756,099

2 Claims. (Cl. 152—10)

This invention relates to tires.

The principal object of this invention is to provide means whereby a pneumatic tire may be used with relative safety in the event that the outer casing should become ruptured when in use, without detracting from the riding-comfort of the pneumatic tire when inflated in normal use.

A further object is to provide an innertube with a downwardly or radially outwardly extended annular member or auxiliary "solid" tire formed of rubber.

A further object is to provide an innertube with a downwardly extended portion having a horizontal or axially extending opening for allowing air forced into a valve to enter an inner air chamber of the innertube.

A further object is to provide a vertical or radially extending opening at right angles to the horizontal opening in order to provide means for inserting a valve.

A still further object is to provide a downwardly extended portion of an innertube having the extreme downward end rounded in form.

In order to prevent accidents it is desirable to provide a tire that will not totally collapse if the casing should be ruptured sufficiently to allow the air to escape.

When an ordinary casing and innertube blows out when in use, the downward drop of the wheel carrying the blown out tire is often the cause of serious accidents. If the blown-out tire is run for any considerable distance, often even before the vehicle can be stopped, the innertube comes loose and its valve-stem severely cuts both the innertube and the casing, in many places, and the casing comes lose (often after being ruined) and finally comes off altogether. According to my invention, this casing is equipped with an innertube having a downwardly extended portion, and hence the relative drop of the wheel carrying the blown out tire would be very slight, thus avoiding an accident, preventing further damage to either the innertube or the casing, and making it possible for the vehicle to be safely driven for a considerable distance, with no more harm than reduced riding-comfort, until the damaged tire can be conveniently repaired or changed.

With the foregoing and other objects in view which will appear as the description proceeds, the invention resides in the combination and arrangement of the parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 shows a cross section through a rim, outer casing, and innertube.

Figure 2 shows a modified form of the device in cross section.

By referring to the drawing it will be seen that there is provided an ordinary rim 1. Mounted upon the rim 1 is an ordinary casing 2. Within this casing 2 there is installed an innertube 3. This innertube 3 is provided with a downwardly extended member 4, which constitutes a resilient, non-inflatable inner auxiliary tire having a rim portion which substantially fills the casing 2 at the rim portion of the latter, thus serving to hold the casing on the rim even when the innertube 3 becomes deflated. The auxiliary tire 4 has a rounded lower or peripheral portion 5 of substantial radial thickness. It will be seen that the downwardly extended member 4 is provided with a horizontal or axially extending opening 6. There is provided an air valve 7 for inflation of the innertube. It will be observed that the valve 7 extends only partway through the inner auxiliary tire 4, so that said auxiliary tire has a substantially uniform radial resilience at all points therearound, even at the valve, as otherwise there would be a bump at the valve whenever the vehicle was operated with the innertube deflated, and the valve would quickly cut through both the innertube 3 and the outer casing 2. In order to install the air valve 7 there is provided a vertical or radially extending opening 8.

By referring to the drawing it will be seen that an air chamber 9 within the innertube 3 takes a crescent form in cross section, the upper ends 10 extending over the major portion of the side walls of the casing 2 and terminating at a point between the rim-engaging portion of the casing and the point of maximum axial extent of the casing when the innertube is inflated. Thus, the major portion of the side walls of the casing are left unimpaired by the inner auxiliary tire 4, so that said side walls are free to flex in the usual manner, when the vehicle is in operation, without impairing the normally expectable riding-comfort or damaging the casing-walls by excessive flexing at unusual places.

Reference to the drawing will also show that the radial thickness of the inner auxiliary tire 4 is sufficient to extend to a point between the tread portion of the casing and the point of maximum axial extent of the casing when the innertube 4 is inflated. The crescent-shaped air-chamber 9 thus has a radial extent, at said tread portion, commensurate with the maximum depression of the casing in normal use, when the tire passes over a rough place in the road, so that, in case of a puncture or a blow-out, the wheel-axis drops only a distance substantially equal to the maximum normal depression of the tire in passing over the worst bump. I thus provide the minimum wheel-dropping and hence the maximum safety, in the event of a deflation of the tire while the vehicle is in motion, while at the same time providing the normal riding comfort of any other pneumatic tire when the tire is inflated.

Reference to the drawing will also show that a substantial proportion of the inside volume of the casing 2 is taken up by my auxiliary tire 4, so that the amount of air required to fill my crescent-shaped air-chamber 9 is very much less than if my inner auxiliary tire 4 were not present, thus reducing the likelihood of the occurrence of a blow-out. Reference to the drawing will also show that the rim-engaging portion of the auxiliary inner tire 4 is wide and flat, so as to firmly engage the entire width of the rim, thus affording a firm foundation against rolling of the inner tire when the outer casing is deflated and the weight of the vehicle is being carried by the inner tire. It will further be observed that the inner tire is of gradually decreasing width toward its tread portion, so that it is of substantial width across its main body-portion. The result of this construction is that the pointed ends 10 of the air-chamber 9 are of relatively narrow width, so that the side walls of the casing are close to the side walls of the inner tire when the air-chamber is properly inflated; and when the air-chamber is deflated, the side walls of the inner tire engage the side walls of the casing as soon as there is any tendency for the casing to roll, thus giving the casing material lateral support against rolling.

Figure 2 is a duplicate of Figure 1, with the exception that the inner tube and safety tire shown in Figure 2 can be made in two parts—independent of each other.

What I claim is:—

1. A safety tire comprising, in combination, a casing having a rim-engaging portion, a tread portion, and side walls; a resilient, non-inflatable inner auxiliary tire within said casing, means for providing a substantially crescent-shaped inflatable air-chamber extending over the outer periphery of said auxiliary tire, within said casing, and valve-means whereby said air-chamber means may be inflated; said air-chamber extending around the inside of the wall portions of said casing, to a point radially within the point of maximum axial extent of said casing when said air-chamber is inflated; said auxiliary tire having a radial thickness sufficient to extend to a point between said tread portion and said point of maximum axial extent of said casing when said air-chamber is inflated; said auxiliary tire having a wide rim-engaging portion affording a firm foundation against rolling, and being of gradually decreasing width toward the tread portion thereof, whereby it has a width sufficient to give the casing substantial support against rolling when the air-chamber means is deflated; and said auxiliary tire having a substantially uniform radial resilience at all points therearound, including the place of said valve-means.

2. A safety tire comprising, in combination, a casing having a rim-engaging portion, a tread portion, and side walls; a resilient, non-inflatable inner auxiliary tire having a rim portion substantially filling said casing at the rim portion thereof, and having a peripheral portion of substantial radial thickness; said auxiliary tire having a wide rim-engaging portion affording a firm foundation against rolling, and being of gradually decreasing width toward the tread portion thereof, whereby it has a width sufficient to give the casing substantial support against rolling when the air-chamber means is deflated; means for providing a substantially crescent-shaped inflatable air-chamber between the peripheral portion of said inner auxiliary tire and the wall and rim portions of said casing, said air-chamber extending around the inside of the wall portions of said casing, to a point between said rim-engaging portion and the point of maximum axial extent of said casing, and said air-chamber having a radial extent, at the tread portion of the casing, commensurate with the maximum depression of the casing in the normal use of the tire; and valve-means whereby said air-chamber means may be inflated, the pointed ends of said crescent-shaped air-chamber, which extend along the sides of said inner auxiliary tire, between said sides and the side walls of the casing, being of sufficiently narrow width so that when said air-chamber is deflated the inner auxiliary tire will give the casing material lateral support against rolling.

WALDO D. NORE.